US010791358B2

(12) United States Patent
Miller et al.

(10) Patent No.: US 10,791,358 B2
(45) Date of Patent: Sep. 29, 2020

(54) SET-TOP BOX WITH INTERACTIVE PORTAL AND SYSTEM AND METHOD FOR USE OF SAME

(71) Applicant: Enseo, Inc., Richardson, TX (US)

(72) Inventors: Thomas R. Miller, Plano, TX (US); William C. Fang, Plano, TX (US); Vanessa Ogle, Fairview, TX (US)

(73) Assignee: Enseo, Inc., Plano, TX (US)

( * ) Notice: Subject to any disclaimer, the term of this patent is extended or adjusted under 35 U.S.C. 154(b) by 0 days.

(21) Appl. No.: 16/213,547

(22) Filed: Dec. 7, 2018

(65) Prior Publication Data

US 2019/0182528 A1 Jun. 13, 2019

Related U.S. Application Data

(60) Provisional application No. 62/595,829, filed on Dec. 7, 2017.

(51) Int. Cl.

| *H04N 21/41* | (2011.01) |
|---|---|
| *H04N 21/422* | (2011.01) |
| *H04N 21/436* | (2011.01) |
| *H04N 21/478* | (2011.01) |
| *H04N 21/8545* | (2011.01) |
| *B25J 13/00* | (2006.01) |
| *H04N 21/438* | (2011.01) |
| *B25J 11/00* | (2006.01) |

(52) U.S. Cl.
CPC ........ *H04N 21/4131* (2013.01); *B25J 11/008* (2013.01); *B25J 13/006* (2013.01); *H04N 21/42203* (2013.01); *H04N 21/4383* (2013.01); *H04N 21/43615* (2013.01); *H04N 21/8545* (2013.01); *H04N 21/47815* (2013.01)

(58) Field of Classification Search
CPC .... H04N 21/40; H04N 21/41; H04N 21/4104; H04N 21/4131; H04N 21/414; H04N 21/422; H04N 21/42207
See application file for complete search history.

(56) References Cited

U.S. PATENT DOCUMENTS

| 5,661,517 | A | 8/1997 | Budow et al. |
|---|---|---|---|
| 7,082,350 | B2 | 7/2006 | Skoog |
| 9,088,828 | B2 | 7/2015 | Ogle et al. |
| 9,326,009 | B2 | 4/2016 | Ogle et al. |
| 9,560,388 | B2 | 1/2017 | Ogle et al. |
| 9,832,489 | B2 | 11/2017 | Ogle et al. |
| 2011/0030016 | A1* | 2/2011 | Pino, Jr. ............... H04L 12/2818 725/80 |

(Continued)

*Primary Examiner* — Hsiungfei Peng
(74) *Attorney, Agent, or Firm* — Scott Griggs; Griggs Bergen LLP

(57) ABSTRACT

A set-top box with an interactive portal and system and method for use of the same are disclosed. In one embodiment of the set-top box, the set-top box includes a housing that secures a signal input, a signal output, a processor, a transceiver, and memory therein in an interconnected bus architecture. The set-top box establishes a pairing with a proximate robot executing room service to a room where the set-top box is located. As the proximate robot executes room service, signals are received from the proximate robot. The set-top box then generates an interactive portal that provides a description of the behavior of the proximate robot and facilitates guest interaction with the proximate robot.

17 Claims, 5 Drawing Sheets

(56) References Cited

U.S. PATENT DOCUMENTS

| | | | |
|---|---|---|---|
| 2013/0091526 A1* | 4/2013 | Iyer | H04L 65/608 |
| | | | 725/62 |
| 2017/0142449 A1 | 5/2017 | Ogle et al. | |
| 2017/0364074 A1 | 12/2017 | Lau et al. | |
| 2018/0047030 A1 | 2/2018 | Saso et al. | |
| 2018/0111274 A1* | 4/2018 | Seok | B25J 9/0003 |

* cited by examiner

SET-TOP BOX WITH INTERACTIVE PORTAL AND SYSTEM AND METHOD FOR USE OF SAME

PRIORITY STATEMENT & CROSS-REFERENCE TO RELATED APPLICATIONS

This application claims priority from U.S. Patent Application Ser. No. 62/595,829 entitled "Set-Top Box with Interactive Portal and System and Method for Use of Same" filed on Dec. 7, 2017, in the names of Vanessa Ogle et al.; which is hereby incorporated by reference for all purposes.

TECHNICAL FIELD OF THE INVENTION

This invention relates, in general, to set-top boxes and, in particular, to set-top boxes with interactive portals and systems and methods for use of the same that provide additional functionality to hospitality establishments, such as hotels, as an example.

BACKGROUND OF THE INVENTION

Without limiting the scope of the present invention, the background will be described in relation to the hospitality lodging industry, as an example. Labor cost is a major expense item throughout departments within the hospitality lodging industry. Not surprisingly, two service departments are the most labor-intensive: the housekeeping department and the food and beverage department. Efforts to reduce labor must be balanced as employee performance has a significant impact on guest experience in the hospitality lodging industry. The challenge for operators of hotels and other properties in the hospitality lodging industry is to find solutions that maintain service standards while controlling labor costs. Accordingly, there is a need for improved systems and methods that maintain service standards while controlling labor costs.

SUMMARY OF THE INVENTION

It would be advantageous to achieve a set-top box that would improve upon existing limitations in functionality. It would also be desirable to enable a computer-based electronics and software solution that would maintain service standards while controlling labor costs. To better address one or more of these concerns, a set-top box with an interactive portal and system and method for use of the same are disclosed. In one embodiment of the set-top box, the set-top box includes a housing that secures a signal input, a signal output, a processor, a transceiver, and memory therein in an interconnected bus architecture. The set-top box establishes a pairing with a proximate robot executing room service to a room where the set-top box is located. As the proximate robot executes room service, signals are received from the proximate robot. The set-top box then generates an interactive portal that provides a description of the behavior of the proximate robot and facilitates guest interaction with the proximate robot. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
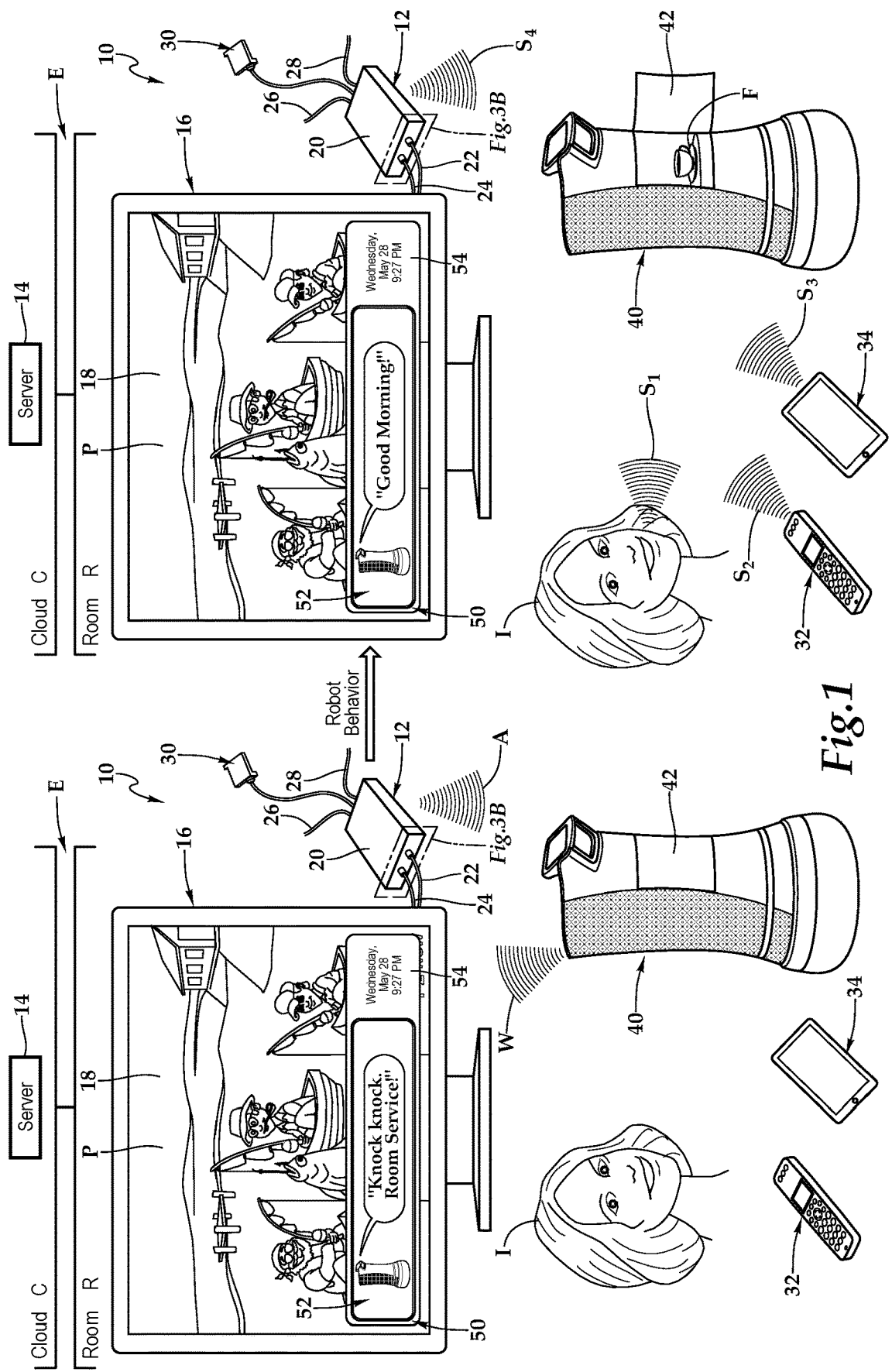
FIG. 1 is a schematic diagram depicting one embodiment of a system utilizing set-top boxes with interactive portals being employed in a hospitality environment, according to the teachings presented herein.

Referring initially to FIG. 1, therein is depicted one embodiment of a system 10 utilizing a set-top box 12 with an interactive portal. The set-top box 12 may be utilized in an environment E, which may be any type of property including, in one example, a hospitality lodging establishment or more generally, hospitality property, which may be a furnished multi-family residence, dormitory, lodging establishment, hotel, hospital, or other multi-unit environment. The set-top box 12 is located in a room R of the environment E and is communicatively disposed with various amenities associated with the environment E. The set-top boxes 12 may be located in communication with a server 14, which may be co-located within the environment E or alternatively, as shown, located within a cloud C.

As illustrated, in one embodiment, within the room R, the system 10 includes the set-top box 12 and a display 16 having a screen 18. The display 16 may be a television or any electronic visual display device, for example. A program P is being shown on the screen 18. The set-top box 12 includes a housing 20. A connection, which is depicted as an HDMI connection 22, connects the set-top box 12 at the housing 20 to the display 16. Other connections include a power cable 24 coupling the set-top box 12 to a power source, a coaxial cable 26 coupling the set-top box 12 to an external cable source, and a category five (Cat 5) cable 28 coupling the set-top box 12 to an external source. As shown, the set-top box 12 may include a dongle 30 providing particular technology and functionality extensions thereto. That is, the set-top box 12 may be a set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 16. Additionally, the set-top box 12 may be deployed in an in-wall configuration.

In one embodiment, an individual I may issue voice commands, such as signaling $S_1$, from a distance to the set-top box 12 in order to control the display 16 via the set-top box 12, for example, or otherwise interact with the set-top box 12. A television remote control 32 includes an array of buttons for adjusting various settings such as television channel and volume. In one embodiment, the television remote control 32 may be a consumer infrared (IR), Bluetooth or other wireless-protocol-based device configured as a small wireless handheld object that issues commands, such as signaling $S_2$, from a distance to the set-top box 12 in order to control the display 16 via the set-top box 12, for example, or otherwise interact with the set-top box 12. A proximate wireless-enabled interactive programmable device 34 is illustrated as a tablet computer having a touch screen display. Although a tablet computer is depicted, the proximate wireless-enabled interactive programmable device 34 may be a personal computer, laptop, smart phone, smart speaker, or smart watch, for example. The proximate wireless-enabled interactive programmable device 34 issues commands, such as signaling $S_3$, from a distance to the set-top box 12 in order to control the display 16 via the set-top box 12, for example, or otherwise interact with the set-top box 12.

A robot 40 with a service compartment 42, including food item F, may be a device that is capable of carrying out a complex series of actions automatically, such as delivering service items to a room. As will be discussed in further detail below, in one implementation, advertising broadcast data A originating from the set-top box 12 or advertising broadcast data A from the robot 40 may be utilized to identify the proximate robot 40. Further, in another implementation, an application installed from the server 14 enables the set-top box 12 and the robot 40 to be wirelessly paired. In another embodiment, a challenge-response is utilized to wirelessly pair the set-top box 12 and the robot 40.

As shown, the program P is displayed on the display 16. In one implementation, as illustrated, the set-top box 12 extends a physical authorization interface from the set-top box 12 to an area easily accessible to the proximate robot 40. This physical authorization interface may include a short range wireless data connection that is enabled only when very close physically to the proximate robot 40, for example.

In one implementation, a search operation is utilized to identify the proximate robot 40. Responsive to identifying the proximate robot 40, a fully tuned signal is forwarded from the set-top box 12 to the display 16 which includes an interactive portal 50, including customized content relative to the proximate robot 40. That is, in one operational embodiment, in response to receiving a status update, via wireless signaling W, from the proximate robot 40, the set-top box 12 has generated an interactive portal 50. As shown, the set-top box 12 communicates with the robot 40 with wireless signal $S_4$. Alternatively, in another implementation, the individual I may press a service button on a device, such as the television remote control 32 or the proximate wireless-enabled interactive programmable device 34, or navigate a menu to cause the generation of the interactive portal 50, which may be overlayed or superimposed on the program P on the display 16, in one embodiment, or partially or fully integrated therewith. The interactive portal 50 includes robot presentation 52 presented as an interactive icon and an informational presentation 54 is provided, which includes date and time. It should be appreciated that any number or configuration of interactive icons may be presented, including an entire screen of interactive icons or a scrolling feature allowing a defined space to provide many sheets of interactive icons. By way of example and not by way of limitation, the interactive icon 52 furnishes a robot presentation that provides a description of the behavior of the proximate robot 40.

As shown, the individual I views the interactive portal 50, including the interactive icon 52 which conveys "Knock knock Room Service!" on the interactive portal 50 and, in one embodiment, by sound as well. This presentation provides a description of the behavior of the proximate robot 40, which is at the door of the room R. Upon the proximate robot 40 entering the room R, then the interactive portal 50 is updated with the message "Good Morning!" from the proximate robot 40. The interactive icon 52 may be words, graphical representations or a combination of words and graphical representations, for example. Further, the icon may include the use of sound as well. In one implementation, the icons and information presentations may be language independent. In this manner, the set-top box 12 is providing various environmental support without the need for additional technology. Further, complex systems that require additional training for a guest to interact with a robot are not needed as the systems and methods presented herein are intuitive.

Figure 2A:
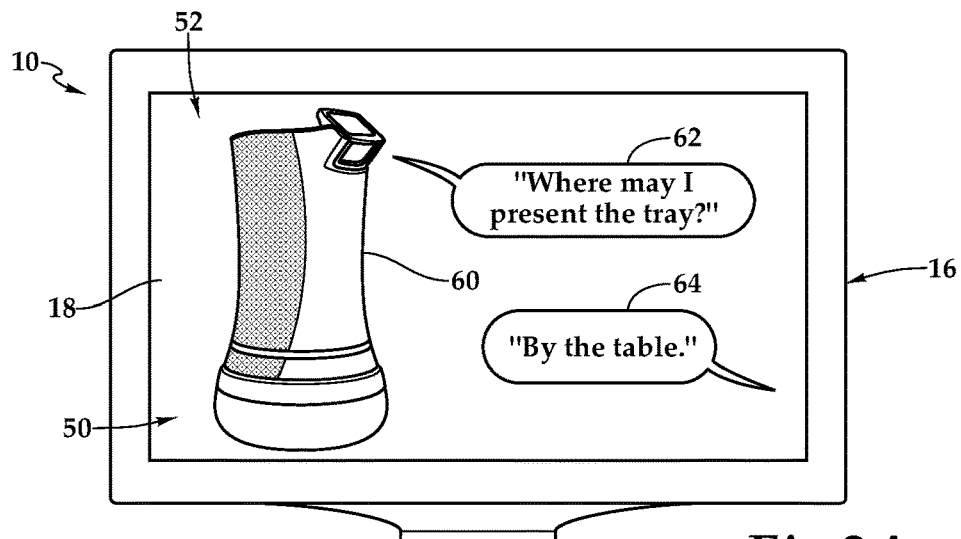
FIG. 2A is a schematic diagram depicting one embodiment of a display depicted in FIG. 1, under control of the set-top box, exhibiting exemplary enhanced functionality.
Figure 2B:
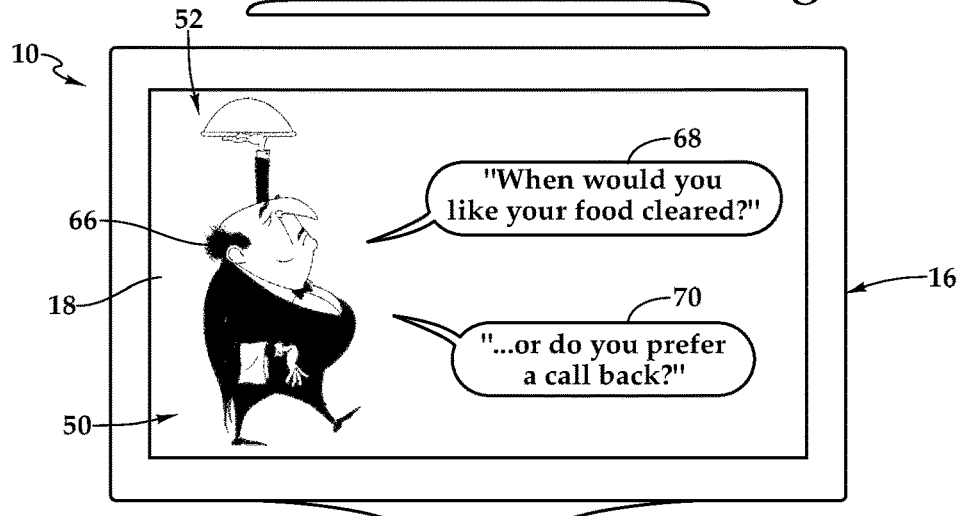
FIG. 2B is a schematic diagram depicting one embodiment of the display depicted in FIG. 1, under control of the set-top box, exhibiting further exemplary enhanced functionality.
Figure 2C:
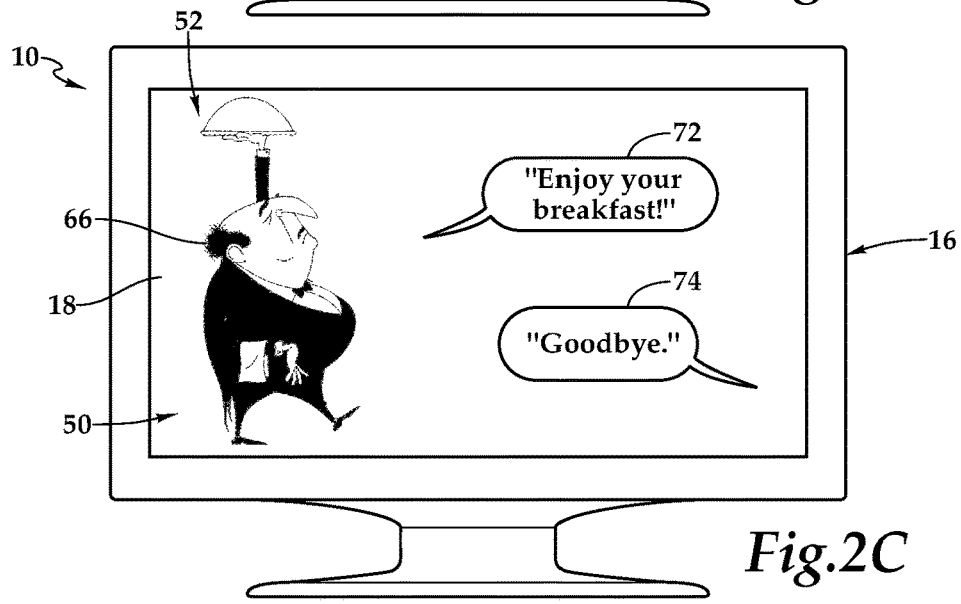
FIG. 2C is a schematic diagram depicting one embodiment of the display depicted in FIG. 1, under control of the set-top box, exhibiting further still exemplary enhanced functionality.
Figure 3A:
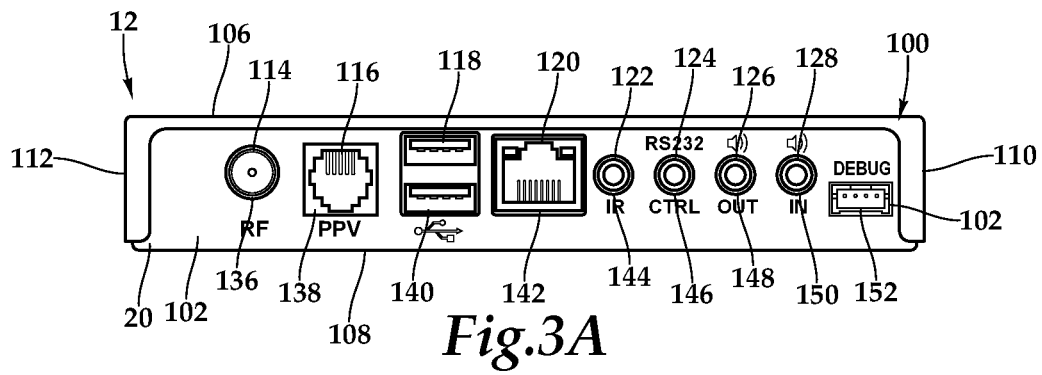
FIG. 3A is a front elevation view of one embodiment of a set-top box depicted in FIG. 1 in further detail.
Figure 3B:
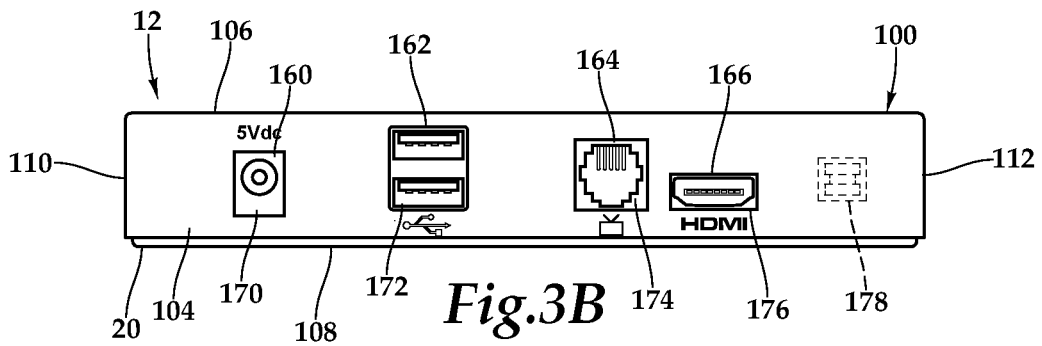
FIG. 3B is a rear elevation view of the set-top box depicted in FIG. 3A.
Figure 3C:
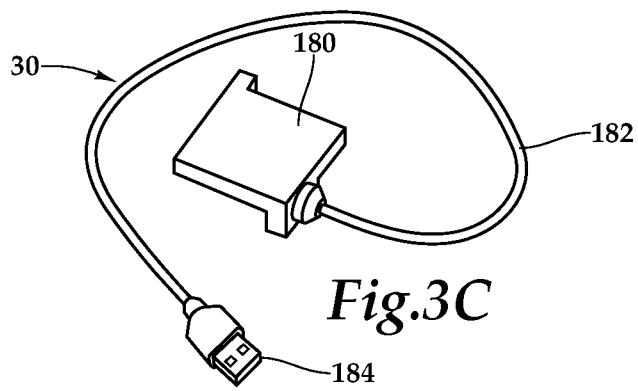
FIG. 3C is a front perspective view of a dongle depicted in FIG. 1 in further detail.
Figure 4:
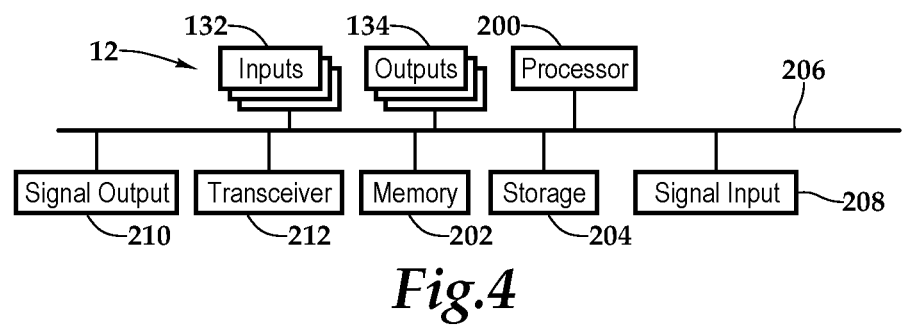
FIG. 4 is a functional block diagram depicting one embodiment of the set-top box presented in FIGS. 3A and 3B.

In the embodiments presented in FIGS. 2A, 2B and 2C, the interactive portal 50 and the robot presentation 52 furnish the descriptions of the behavior of the proximate robot 40. The robot presentation 52 may relate to a service such as room service, order taking, delivering a tray, delivering an order, beverage service, clearing a tray, presenting a bill for an order, parcel service, suggestive selling, and menu presentation. In this manner, the proximate robot 40 executes a set of room service procedures while guest interactions are facilitated by the robot presentation 52. The guest interactions, in turn, may relate to greetings and inquiries about guest preferences related to room service in a room where the set-top box 12 is located. By way of example and not by way of limitation, with reference to FIG. 2A, the display 16 includes the screen 18 which is showing the interactive portal 50 that includes the entire screen 18. The interactive portal 50 may include the entire screen 18 or a smaller portion thereof. A graphical representation 60 depicts the robot 40 with dialog providing a description of the behavior of the robot 40. As shown, the robot 40 has entered the room R including the set-top box 12 and the display 16. The robot 40 following the aforementioned pairing with the set-top box is utilizing the graphical representation 60 to ask, "Where may I present the tray?" as shown by question 62. In response 64, the guest has stated, "By the table." In one implementation, the responses of the guest are received by the set-top box 12 and/or the robot 40 and also shown on the display 16 by the set-top box 12 to improve the accuracy of the conversation and information being provided to the robot 40.

With reference to FIG. 2B, in one implementation, the robot presentation 52 may be an avatar 66 of the robot 40. Continuing with the example in FIG. 2A, the robot 40 asks, "When would you like your food cleared?" and " . . . or do you prefer a call back?" at question and question 70, respectively. As previously alluded, the robot presentation 52 may include graphical representations, words, speech, or some combination thereof. As shown in FIG. 2C, the introduction concludes with the robot 40 stating "Enjoy your breakfast!" at declaration 72 and the guest responding with "Goodbye." at response 74.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. The functionality may also include providing an access point to a high speed wireless internet connection. Such set-top boxes are used in cable television, satellite television, and over-the-air television systems, for example.

The set-top box 12 includes a housing 20 including a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall 104 includes various ports, ports 114, 116, 118, 120, 122, 124, 126, and 128 that provide interfaces for various interfaces, including inputs and outputs. In one implementation, as illustrated, the ports 114 through 128 include inputs 132 and outputs 134 and, more particularly, an RF input 136, an RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. Additionally, the set-top box 12 may include a microphone 178 for receiving information or instructions from a guest, for example. It should be appreciated that the configuration of ports may vary with the set-top box 12 depending on application and context. As previously alluded to, the housing 20 may include a housing-dongle combination including, with respect to the dongle 30, a unit 180 having a cable 182 with a set-top box connector 184 for selectively coupling with the set-top box 12.

Within the housing 20, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 20 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 12. Various inputs 132 and outputs 134 provide connections to and from the computing device, wherein the inputs 132 are the signals or data received by the set-top box 12, and the outputs 134 are the signals or data sent from the set-top box 12. A television content signal input 208 and a signal output 210 are also secured in the housing 20 in order to receive content from a source in the hospitality property and forward the content, including external content such as cable and satellite and pay-per-view (PPV) programming, to the television located within the hotel room.

A transceiver 212 is associated with the set-top box 12 and communicatively disposed with the bus 206. As shown the transceiver 212 may be internal, external, or a combination thereof to the housing. Further, the transceiver 212 may be a transmitter/receiver, receiver, or an antenna for example. Communication between the robot 40 in the hotel room and the set-top box 12 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized. As previously discussed, the transceiver 212 is configured to be joined in network communication with an environmental amenity or amenities that are co-located within the room of the respective set-top box 12.

In one embodiment, the storage 204 stores any configuration profiles required for communication with the robot 40. The memory 202 and storage 204 are accessible to the processor 200 and include processor-executable instructions that, when executed, cause the processor 200 to execute a series of operations. The processor-executable instructions cause the processor 200 to receive a signal via the transceiver 212 from the proximate robot 40 and access a configuration profile and determine a robot presentation 52 relative to the signal. As previously discussed, the configuration profile enables the set-top box 12 to communicate with a proximate robot 40 and the robot presentation 52 provides a description of the behavior of the proximate robot 40. The processor-executable instructions then may cause the processor 200 to generate an interactive portal 50 including the robot presentation 52 and forward the interactive portal 50 to the display 16 via the signal output 210. The processor-executable instructions may then cause the processor 200 to receive an interactive instruction relative to the interactive portal and transmit the interactive instruction via the transceiver 212 to the proximate robot 40.

Figure 5:
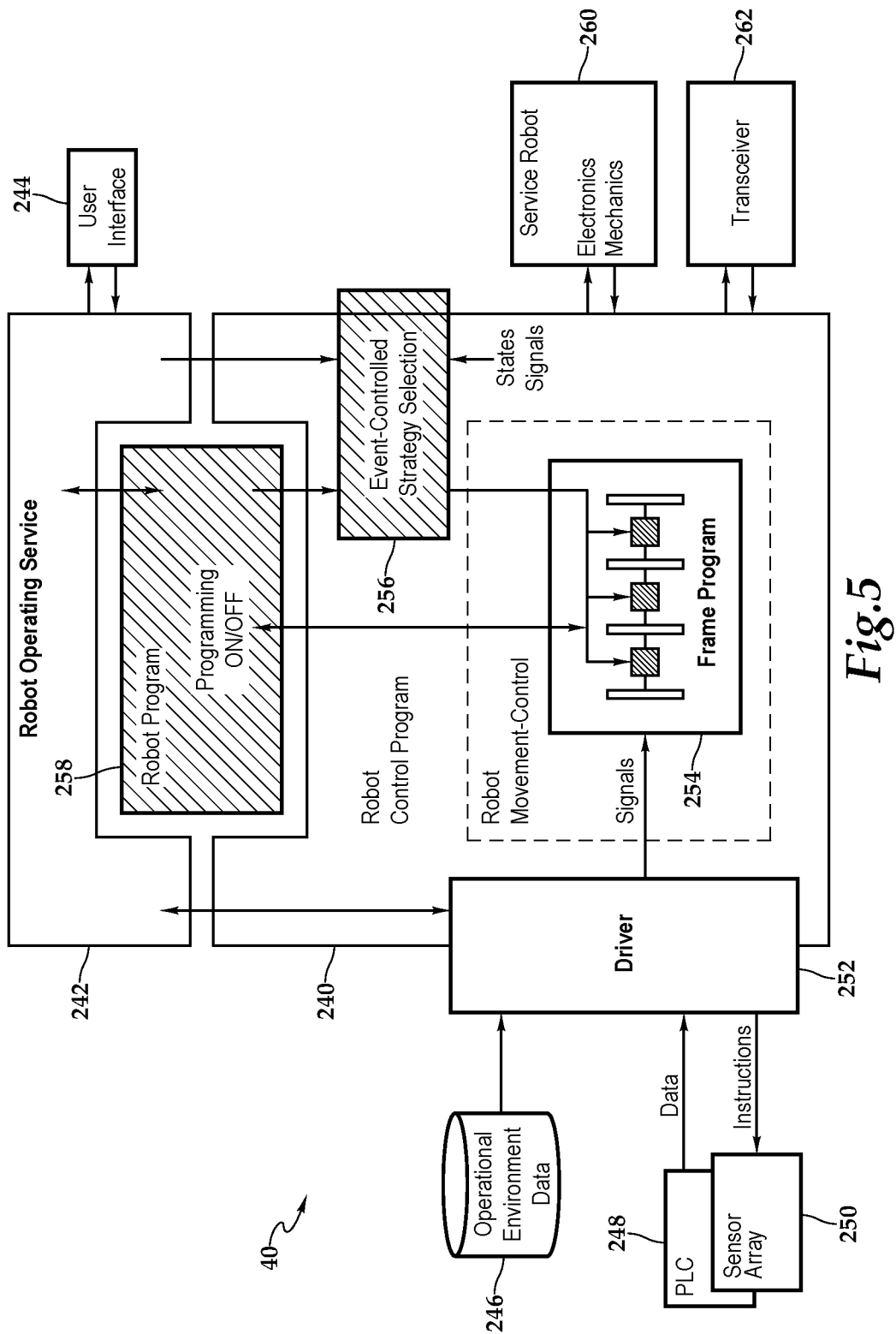
FIG. 5 is a schematic diagram of one embodiment of a robot which is interacting with the set-top box.

FIG. 5 depicts one embodiment of the robot 40, which interacts with the system 10. The essence of the robot 40 is a robot system or control program 240, which controls the robot 40. The control program 240 is operated by means of an operating service 242 in communication with the user interface 244 and receives input data (as well as provide instructions, as appropriate) from the operational environmental database 246, programmable logic controller 248, and sensor array 250 by means of a driver 252. It should be appreciated, that the independence of the robot control program 240 may vary. In one implementation, as illustrated, the robot control program 240 may be under the control of the programmable logic controller 248. In another implementation, the robot control program 240 is more autonomous and may include features such as direct connection to the user interface 244.

According to one embodiment, between the driver 252 and the robot control program 240 is provided an independent data processing layer in the form of a frame program 254, which controls the robot movements, and a unit 256 for automated or event-controlled strategy or behavioral selection on the basis of the states and signals which occur. User application programs, event-controlled strategy selections and sensor programs in the frame program 254 can be programmed by an operator and directed by a robot program 258, which monitors the balance and implementation of manual and automatic control of the service robot electronics and mechanics 260, which may use a transceiver 262 to facilitate wireless communications. The wireless communications may be enabled with the set-top box 12 directly or with the set-top box 12 via the server 14 and be enabled by a variety of wireless methodologies employed by the transceiver 262, including 802.11, 3G, 4G, Edge, WiFi, ZigBee, near field communications (NFC), Bluetooth low energy and Bluetooth, for example. Also, infrared (IR) may be utilized.

Figure 6:
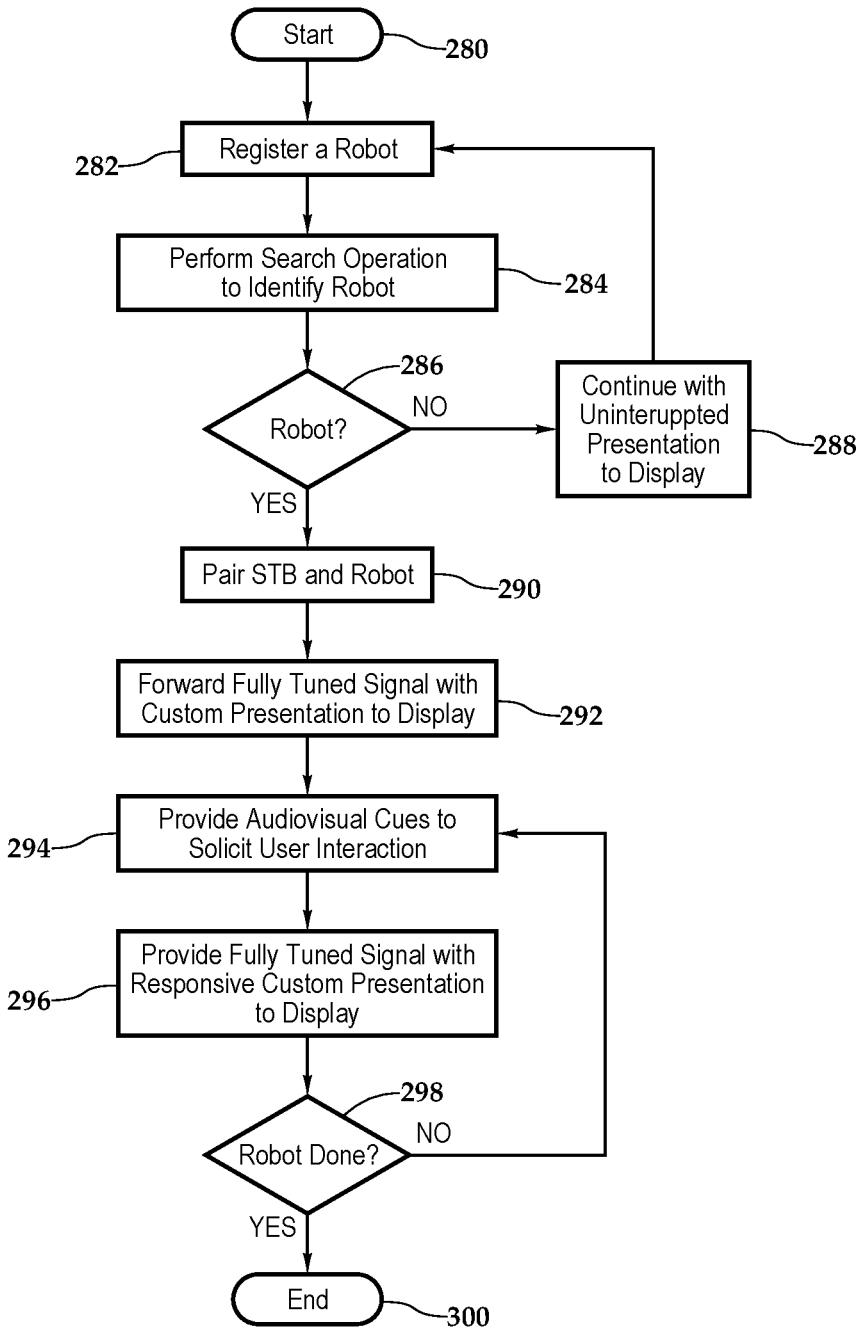
FIG. 6 is a flow chart depicting one embodiment of a method utilizing set-top boxes with interactive portals according to the teachings presented herein.

Referring now to FIG. 6, one embodiment of a method utilizing set-top boxes with interactive portals is depicted. At block 280, the methodology is initiated. At block 282, in one embodiment, a robot is registered with the set-top box 12 by way of a configuration profile, which enables the set-top box 12 to communicate with a proximate robot 40. As previously discussed, the configuration profile may be pre-stored at the set-top box 12. At block 284, a search operation is performed to identify the robot 40. At decision block 286, if no robot 40 is identified, then the methodology continues to block 288, where the uninterrupted presentation to the display 16 from the set-top box 12 continues. Following block 288, the methodology returns to block 284. The loop between block 284, decision block 286, and block 288 continues until a robot 40 is identified at decision block 286. Once the robot 40 is identified then the methodology advances to block 290, where the robot 40 and the set-top box 12 are paired.

At block 292, once the robot 40 and the set-top box 12 are paired, a fully tuned signal with a custom presentation is forwarded to the display 16. As discussed, the custom presentation may be the robot presentation 52, which provides a description of the behavior of the proximate robot 40. Also, as discussed, the robot 40 may within the same room as the set-top box 12 and associated display 16 in order to perform a service task. For example, in a hospitality establishment, the robot 40 may be delivering a food service item to a guest's room. The set-top box 12 facilitates communication between the robot 40 and the guest. At block 294, in response to communication between the robot 40 and the set-top box 12, the robot presentation 52 includes audiovisual cues to solicit user interaction. By way of example, with respect to the robot 40 delivering a food service item to a guest's room in a hospitality establishment, the robot 40 may solicit user interaction about the location in the room R to present the food service item or the preferred time of return to retrieve any service items such as trays and utensils. At block 296, in response to the feedback received from the guest at the set-top box 12 and possible communication with the robot 40, the set-top box 12 provides a fully tuned signal to the display 16 with a responsive custom presentation. At decision block 298, if the robot 40 has completed executing the operations, then the methodology advances to block 300 and ends. On the other hand, if the robot 40 has not completed executing the operations, then the methodology returns to block 294.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
    a housing securing a signal input, a signal output, a processor, a transceiver, and memory therein;
    a busing architecture communicatively interconnecting the signal input, the signal output, the transceiver, the processor, and the memory;
    the signal input configured to receive a source signal from an external source, the source signal including a plurality of channels;
    the signal output configured to forward a tuned signal to a display connected to the signal output, the signal being tuned from the source signal at the set-top box;
    a configuration profile stored in the memory, the configuration profile enables the set-top box to communicate with a proximate robot, the proximate robot executing room service to a room where the set-top box is located; and
    the memory accessible to the processor, the memory including processor-executable instructions that, when executed, cause the processor to:
        establish a pairing between the proximate robot and the set-top box,
        as the proximate robot executes the room service, receive a plurality of signals via the transceiver from the proximate robot,
        access the configuration profile and determine a robot presentation relative to the plurality of signals, the robot presentation provides a description of the behavior of the proximate robot during the execution of the room service, the robot presentation including an avatar of the proximate robot,
        maintain an interactive portal including the robot presentation, the interactive portal includes a graphical representation and speech relative to a service selected from the group consisting of order taking, delivering a tray, delivering an order, beverage service, clearing a tray, presenting a bill for an order, parcel service, suggestive selling, and menu presentation,
        forward the interactive portal to the display via the signal output,
        periodically receive an interactive instruction relative to the robot presentation on the interactive portal, and
        transmit the interactive instruction via the transceiver to the proximate robot.

2. The set-top box as recited in claim 1, wherein the robot presentation further comprises words.

3. The set-top box as recited in claim 1, wherein the robot presentation further comprises a graphical representation.

4. The set-top box as recited in claim 1, wherein the robot presentation further comprises a combination of words and a graphical representation.

5. The set-top box as recited in claim 1, wherein the robot presentation further comprises speech.

6. The set-top box as recited in claim 1, wherein the robot presentation relates to room service in a hospitality establishment to a room where the set-top box is located.

7. The set-top box as recited in claim 6, wherein the hospitality establishment is selected from the group consisting of furnished multi-family residences, dormitories, lodging establishments, hotels, hospitals, and multi-unit environments.

8. The set-top box as recited in claim 1, wherein the robot presentation relates to a service selected from the group consisting of order taking, delivering a tray, delivering an order, beverage service, clearing a tray, presenting a bill for an order, parcel service, suggestive selling, and menu presentation.

9. The set-top box as recited in claim 1, wherein the proximate robot executes a set of room service procedures while guest interactions are facilitated by the robot presentation.

10. The set-top box as recited in claim 9, wherein the guest interactions are selected from a group consisting of greetings and inquiries about guest preferences related to room service in a room where the set-top box is located.

11. The set-top box as recited in claim 1, wherein the processor-executable instructions to receive the interactive instruction relative to the interactive portal further comprise processor-executable instructions to receive an instruction selected from the group consisting of a command from a remote control, a command from a proximate wireless-enabled interactive programmable device, and speech.

12. The set-top box as recited in claim 1, wherein the processor-executable instructions to receive the interactive instruction relative to the interactive portal further comprise processor-executable instructions to receive the interactive instruction relative to the interactive portal via the transceiver.

13. The set-top box as recited in claim 1, wherein the processor-executable instructions to receive the interactive instruction relative to the interactive portal further comprise processor-executable instructions to receive the interactive instruction relative to the interactive portal via a microphone, the microphone being communicatively interconnected with the busing architecture.

14. The set-top box as recited in claim 1, wherein the transceiver is configured to communicate with the proximate robot via a standard selected from the group consisting of infrared (IR), 802.11, 3G, 4G, Edge, Wi-Fi, ZigBee, near field communications (NFC), Bluetooth, and Bluetooth low energy.

15. The set-top box as recited in claim 1, wherein the housing further comprises a housing-dongle combination securing the signal input, the signal output, the processor, memory, and storage therewith.

16. The set-top box as recited in claim 13, wherein the processor and the memory are distributed through the housing-dongle combination.

17. The set-top box as recited in claim 1, wherein the display is selected from the group consisting of televisions and electronic visual display devices.

* * * * *